United States Patent
Letocart et al.

(10) Patent No.: US 10,343,322 B2
(45) Date of Patent: Jul. 9, 2019

(54) DEVICE FOR EXTRUDING ELASTOMER MIXTURES

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Arnaud Letocart, Clermont-Ferrand (FR); Christophe Ougier, Clermont-Ferrand (FR); Gerard Crosnier, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 107 days.

(21) Appl. No.: 14/905,992

(22) PCT Filed: Jul. 18, 2014

(86) PCT No.: PCT/EP2014/065561
§ 371 (c)(1),
(2) Date: Jan. 19, 2016

(87) PCT Pub. No.: WO2015/007906
PCT Pub. Date: Jan. 22, 2015

(65) Prior Publication Data
US 2016/0151953 A1      Jun. 2, 2016

(30) Foreign Application Priority Data

Jul. 18, 2013   (FR) ..................................... 13 57081

(51) Int. Cl.
B29B 7/42      (2006.01)
B29B 7/58      (2006.01)
(Continued)

(52) U.S. Cl.
CPC .............. *B29C 48/575* (2019.02); *B29B 7/42* (2013.01); *B29B 7/582* (2013.01);
(Continued)

(58) Field of Classification Search
CPC ............ B29C 47/6062; B29C 47/6012; B29C 47/6006; B29C 47/082; B29C 47/126;
(Continued)

(56) References Cited

U.S. PATENT DOCUMENTS 2,224,212 A * 12/1940 Bowling ................. B30B 11/00
                                                                  425/297
2,514,841 A *  7/1950 Chase .................... B29B 7/421
                                                                  264/146
(Continued)

FOREIGN PATENT DOCUMENTS

GB        894127          4/1962
JP     H03124806 U       12/1991
WO      2008004313        1/2008

OTHER PUBLICATIONS

International Search Report for Priority Application PCT/EP2014/065561 dated Sep. 8, 2014.

*Primary Examiner* — Tony G Soohoo
(74) *Attorney, Agent, or Firm* — Dickinson Wright PLLC

(57) ABSTRACT

The present disclosure relates to devices for extruding plastics, notably mixtures of elastomers which are intended to be used in the manufacture of tires.

16 Claims, 3 Drawing Sheets

(51) Int. Cl.
   *B29C 48/25* (2019.01)
   *B29C 48/30* (2019.01)
   *B29C 48/51* (2019.01)
   *B29C 48/52* (2019.01)
   *B29C 48/575* (2019.01)

(52) U.S. Cl.
   CPC .......... *B29C 48/2561* (2019.02); *B29C 48/51* (2019.02); *B29C 48/52* (2019.02); *B29B 7/421* (2013.01); *B29C 48/268* (2019.02); *B29C 48/30* (2019.02); *B29C 48/302* (2019.02); *B29C 48/303* (2019.02)

(58) Field of Classification Search
   CPC ..... B29C 47/124; B29C 47/0871; B29B 7/42; B29B 7/582; B29B 7/421
   See application file for complete search history.

(56) References Cited

U.S. PATENT DOCUMENTS

| | | | | | |
|---|---|---|---|---|---|
| 2,813,302 | A * | 11/1957 | Beck | ................ | B29B 7/421 264/176.1 |
| 3,006,029 | A * | 10/1961 | Saxton | ................ | B29C 47/60 366/90 |
| 3,174,185 | A * | 3/1965 | Gerber | ................ | B29C 47/527 366/99 |
| 3,191,229 | A | 6/1965 | Vanzo | | |
| 3,427,003 | A * | 2/1969 | Walter | ................ | B29B 7/429 366/307 |
| 3,486,194 | A * | 12/1969 | Parks | ................ | B29C 47/60 425/204 |
| 3,497,582 | A * | 2/1970 | Pettersson | ................ | B29C 47/6006 264/209.3 |
| 3,572,646 | A * | 3/1971 | Kocher | ................ | B22D 11/10 366/89 |
| 3,730,492 | A * | 5/1973 | Maddock | ................ | B29C 47/6006 366/82 |
| 3,756,574 | A * | 9/1973 | Maddock | ................ | B29C 47/6006 366/82 |
| 3,780,995 | A * | 12/1973 | Burkle et al. | ................ | B29C 44/3442 366/87 |
| 3,942,774 | A * | 3/1976 | Sokolow | ................ | B29C 47/38 366/196 |
| 4,128,342 | A * | 12/1978 | Renk | ................ | B29B 7/401 366/303 |
| 4,383,764 | A * | 5/1983 | Sloin | ................ | B29C 47/38 366/75 |
| 4,407,647 | A * | 10/1983 | Denzler | ................ | C11D 13/18 366/77 |
| 4,749,279 | A * | 6/1988 | Csongor | ................ | B29B 7/421 366/312 |
| 5,000,900 | A * | 3/1991 | Baumgartner | ................ | B29B 7/482 264/211.23 |
| 5,178,458 | A * | 1/1993 | Hsu | ................ | B29C 47/60 366/89 |
| 5,439,633 | A * | 8/1995 | Durina | ................ | B29B 7/428 264/328.17 |
| 5,501,519 | A * | 3/1996 | Miyauchi | ................ | B29C 45/60 366/78 |
| 5,599,096 | A * | 2/1997 | Rog | ................ | B29C 47/38 366/78 |
| 5,823,668 | A * | 10/1998 | Womer | ................ | B29C 47/6031 366/318 |
| 5,988,866 | A * | 11/1999 | Barr | ................ | B29B 7/421 366/80 |
| 6,887,062 | B1 * | 5/2005 | Burg | ................ | B29C 47/0004 264/211.21 |
| 7,246,936 | B2 * | 7/2007 | Gates | ................ | B29B 7/482 366/82 |
| 7,255,472 | B2 * | 8/2007 | Nikolai | ................ | B29B 7/421 366/82 |
| 9,517,582 | B2 * | 12/2016 | Fitzpatrick | ................ | B29C 45/77 |
| 9,623,593 | B2 * | 4/2017 | Fitzpatrick | ................ | G05B 19/042 |
| 2005/0111294 | A1 * | 5/2005 | Gates | ................ | B29B 7/421 366/81 |
| 2009/0258100 | A1 * | 10/2009 | Williams | ................ | B29C 47/08 425/135 |

\* cited by examiner

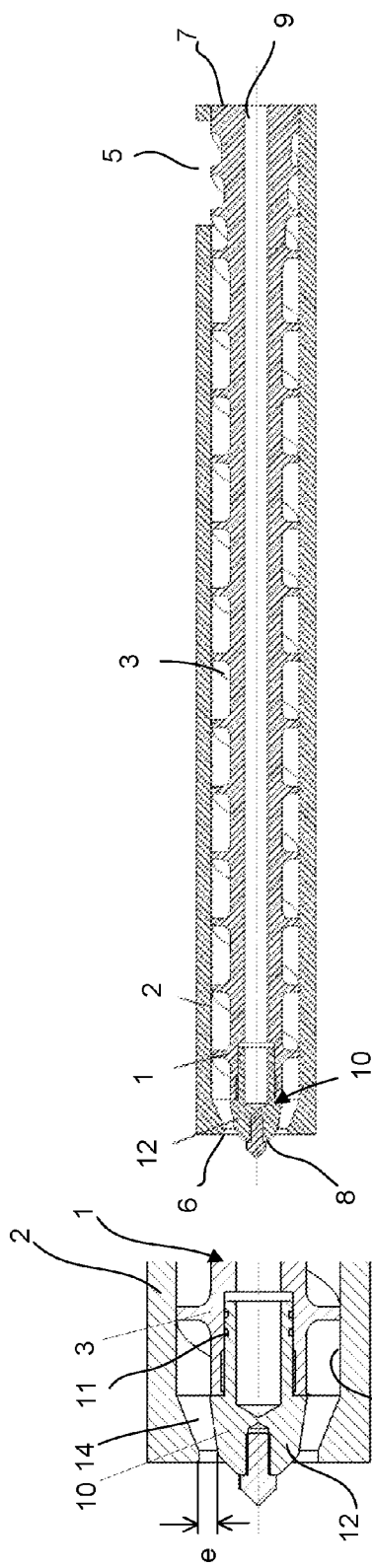
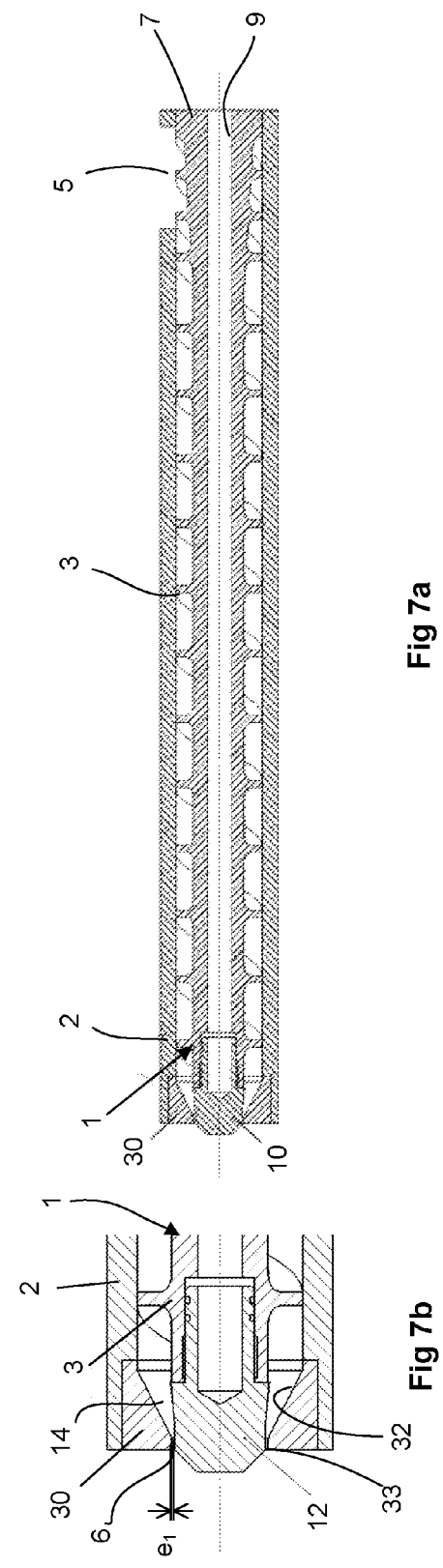

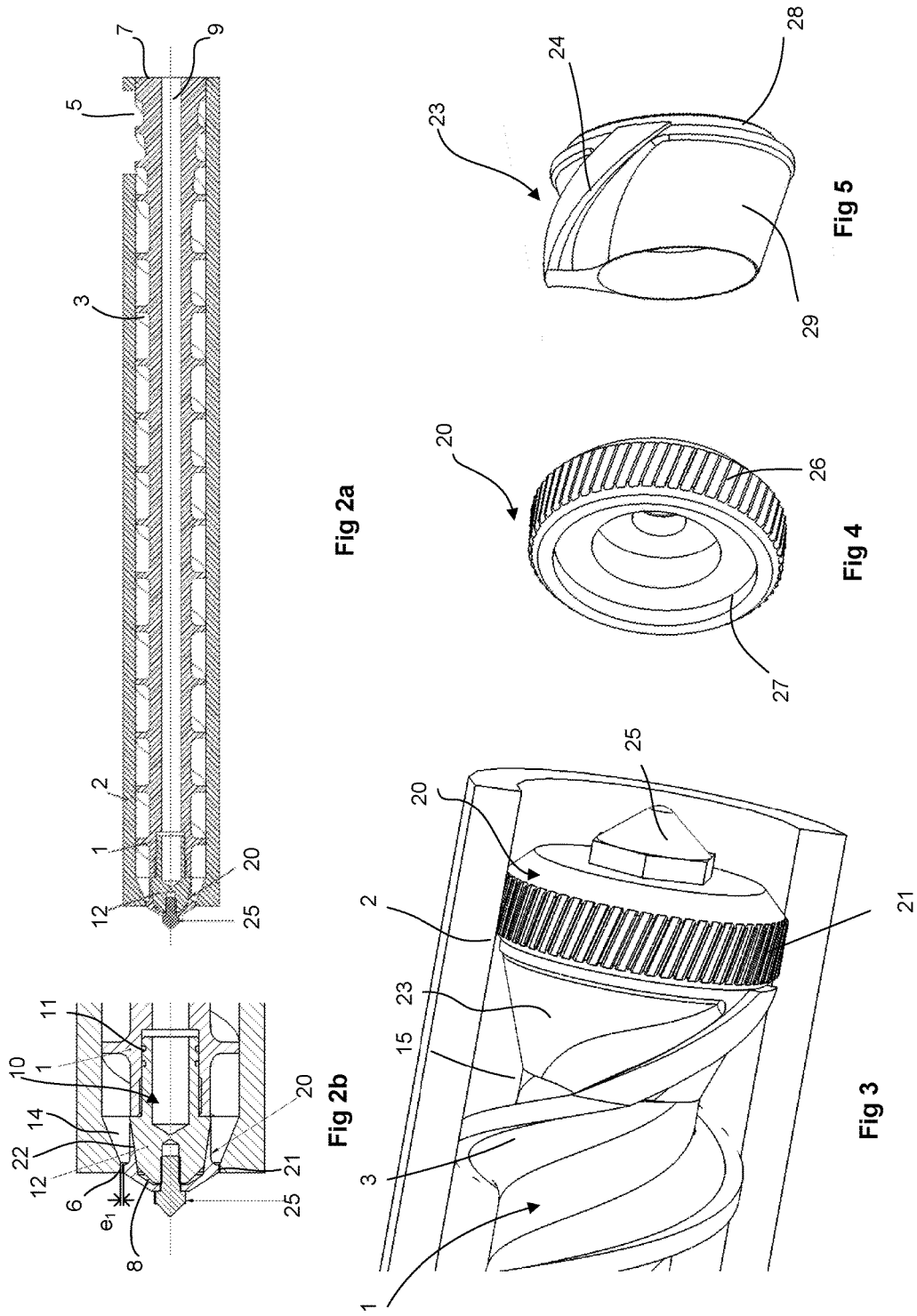

DEVICE FOR EXTRUDING ELASTOMER MIXTURES

This application is a 371 national phase entry of PCT/EP2014/065561, filed 18 Jul. 2015, which claims benefit of French Patent Application No. 1357081, filed 18 Jul. 2013, the entire contents of which are incorporated herein by reference for all purposes.

BACKGROUND

1. Field

The present disclosure relates to devices for extruding plastics, notably mixtures of elastomers which are intended to be used in the manufacture of tires.

2. Description of Related Art

These extrusion devices generally comprise an extrusion screw positioned inside a barrel and the purpose of which is to propel and pressurize the mixtures that are to be extruded, the final shape of the extruded product being given by an exit die. The screw also has the function of homogenizing the mixture and, in particular, of ensuring good uniformity of the thermal, rheological and chemical characteristics within the volume of the mixture, so that these remain constant at the exit die.

Various means intended to improve the homogeneity of the mixture in an extrusion device (or extruder) and which are positioned upstream of the exit die of the device are known. These means include, as known from document DE3805849, those which call upon homogenizing fingers arranged at the periphery of the barrel of the extruder and the ends of which protrude into the extrusion chamber to ensure better shearing of the mixture.

There was then a desire to adapt the performance of extruders to suit the various mixtures used with a given screw and a given barrel. Thus, one solution was to mount the homogenizing fingers in an adjustable manner. Such solutions are described for example in documents FR 2193685 or FR 2582251. Thus, by altering the position of the fingers in the extrusion chamber according to the type of mixture contained therein a better quality of mixing can be obtained, but at the expense of an operation that is costly and lengthy when all the time needed to set up all the fingers is added up. Moreover, the prior art also discloses solutions that propose adjusting all the fingers simultaneously, but these are complicated and present problems of sealing between the fingers and the extrusion chamber.

Other known solutions in the state of the art call upon the use of screens or breaker plates mounted at the exit of the extruder, just before the exit die for the extruded product. U.S. Pat. No. 3,756,574 and EP 0381171 describe such devices which improve the homogeneity of the mixture and screen out impurities. These screens or breaker plates mounted before the exit die have the disadvantage of retaining mixture in the mixture passage orifices and the disadvantage of the difficulty of cleaning these orifices.

Document FR 2636560 is also known and describes a device for continuously modifying the operation of an extrusion machine using means that move the screw axially with respect to the barrel of the machine. Such a device makes the construction of the machine complicated and somewhat unreliable.

Also known, from U.S. Pat. No. 3,191,229, is a machine for continuously mixing plastics or rubber comprising a conical ring which, when moved axially, makes it possible to adjust the gap at the exit of the machine. Such an adjustment is, however, sensitive to the axial positioning of the screw.

Document GB 894 127 describes an extruder for plastic tubes comprising a homogenization zone defined between a homogenizing ring and the downstream end of the screw. However, the ring is secured to the tubular extrusion nozzle and designed for a given size and specific material of extruded tube.

Moreover, extrusion machines or devices generally comprise an extrusion screw the form of which is tubular so that it can be cooled when the inside of the screw is placed in communication with a hydraulic cooling circuit. For that, the front end of the screw is closed off by a circuit closure plug and the upstream end of the screw is provided with means of connection to the hydraulic cooling circuit of the machine. In this type of machine, removing and replacing the screw entail disconnecting and draining the hydraulic cooling circuit.

Such is the case with U.S. Pat. No. 2,224,212 which describes a briquette press for briquettes made of sawdust or wood chippings and which comprises a removable forming head. Removal of the head assumes that the cooling circuit has been drained in order to avoid leaks.

SUMMARY

It is one objective of an embodiment of the invention to overcome the disadvantages of the aforementioned documents and to allow a significant improvement in the homogeneity of a mixture of elastomers before the exit from an extruder by easily adapting the characteristics of the extruder to suit the mixture that is to be extruded without disrupting the operation of the hydraulic cooling circuit of the extruder.

This objective is achieved by an embodiment of the invention which proposes a device for extruding mixtures of elastomers comprising a rotary screw with helical flights which is arranged in a fixed barrel, the upstream end of the screw being able to be coupled to rotational-drive means and the downstream end thereof being able to propel a mixture towards an exit die, the screw having a tubular shape to allow a fluid from a hydraulic cooling circuit to flow, the outside diameter of the downstream end of the screw defining, with the inside diameter of the exit orifice of the barrel, a gap for the passage of the mixture, characterized in that it comprises a working ring mounted directly removably with the aid of quick-fit means near the said downstream end so as to modify the gap according to the composition of the mixture used and apply a shear stress to the mixture in the said gap.

Having such a working ring arranged so that it can be removed or interchanged using quick-fit means for fitting it to the mixture exit end of the extruder, it being possible for the ring to be mounted on the screw and/or inside the barrel of the extruder, means that the working ring can be changed quickly and easily according to the composition and physicochemical properties of the mixture of elastomers. When it is said that the ring is directly removable that means that it is mounted interchangeably at the exit of the extruder immediately after the passage at the end, which means to say that the ring becomes directly accessible so that it can be quickly fitted to and removed from the exit end of the extruder, most extruders being accessible at this exit end by swinging the shaping elements thereof (for example the adapter or the roller head) into an open position. What is meant by quick-fit means are removable fixing means that allow the working ring alone to be fitted and removed without the removal and refitting of the other intermediate fixing parts thereof or of the parts of the extruder screw, and more particularly without removing the extrusion screw hydraulic cooling circuit drain plug which closes the circuit at the downstream end of the screw. This means that the hydraulic circuit can be kept operational while the working ring is being exchanged.

Having the working ring of an embodiment of the invention arranged so that it is directly removable and quickly interchangeable near the downstream end of the screw means that the initial size of the gap can be reduced, so that the gap can then be quickly adjusted, this having the effect of applying an additional shear stress to the mixture of elastomers just before the exit orifice of the barrel. This shear stress is thus adapted to suit the mixture of elastomers present in the extruder so as to ensure better homogeneity thereof as it leaves the extruder. What is more, arranging such a ring at the exit of the extruder introduces a pressure drop which causes the delivery per turn of the screw to decrease and makes it possible in this way to increase the amount of work done on the mixture.

What is more, the working ring of an embodiment of the invention is mounted on the screw and/or on the barrel of the extruder, making it possible to obtain additional shearing between a first surface capable of rotating and a second which is fixed. This allows the mixture to be discharged as the screw turns and eliminates any problem of cleaning encountered with the perforated breaker plates or screens of the prior art which were mounted fixed at the exit of the extruder.

For preference, the working ring allows a gap variation between 0.5 and 5% of the nominal diameter of the extruder.

During tests conducted under laboratory conditions with various mixtures of elastomers it was found that by adapting the variation in gap according to the nominal diameter of the extruder it became possible to impose enough stress on the mixture in the gap to obtain good homogeneity at the exit of the extruder.

According to a first embodiment of the invention, the working ring is mounted on a closure plug of the said hydraulic circuit which forms the downstream end of the screw.

According to a second embodiment of the invention, the ring is mounted inside the barrel.

In an alternative form of embodiment of the invention, the surface of the working ring that defines the said gap is smooth. It was found during tests conducted under laboratory conditions that, for pre-established values of the gap measured between the smooth surface of the working ring and the surface opposite belonging to the barrel or to the screw of the extruder, additional shearing work was obtained even in the case of a smooth surface.

In one alternative form of embodiment of the invention, the surface of the working ring that defines the said gap is crenulated. It was found during tests conducted under laboratory conditions that the crenulations thus created ensure better movement of the mixture at the rear of each crenulation as viewed in the direction in which the screw rotates, the gap allowing this work being defined between the base of the crenulation and the surface opposite belonging to the barrel or to the screw of the extruder.

For preference, the working ring has crenulations that are inclined and rectilinear or in the form of a helix.

In one advantageous embodiment, the crenulations that are inclined or in the form of a helix make an angle of less than 45° with the axial direction of the screw. This confers a greater amount of shear on the mixture than when the crenulations are straight.

In another advantageous embodiment of the invention, the crenulations that are inclined or in the form of a helix make an angle of between 45° and 80° with the axial direction of the screw. This additionally makes it possible to assist with discharging the mixture and emptying the extruder.

For preference too, after the said working ring has been adjusted, the gap decreases down to a value of between 0.3 mm and 5 mm.

For preference, the working ring is of cylindrical overall shape with a diameter greater than its width. Preference is given to a cylindrical working ring because that presents no problems of the shape or dimensions of the gap changing as a result of expansion during the mixing work.

Advantageously, the usable width of the working ring is less than or equal to the diameter of the extrusion screw.

It was thus found, during tests conducted under laboratory conditions, that the usable (or shear) width of the working ring is directly proportional to the pressure drop and the shearing time experienced by the mixture in the extruder. Thus, for extruder screw diameters of between 110 and 150 mm, the usable width of the working ring is preferably chosen to lie in the range comprised between 2 and 30 mm. For screw diameters greater than 150 mm, the usable width of the screw may increase until it is equal to the diameter of the extrusion screw (275 mm).

BRIEF DESCRIPTION OF DRAWINGS

The invention will be better understood from the following passage of the description, which relies on the following figures:

FIG. 1a is a view in longitudinal section showing a screw and barrel assembly of an extrusion device of the state of the art and FIG. 1b is a view on a larger scale of a detail of the left part of FIG. 1a, FIG. 2a is a view in longitudinal section showing a screw and barrel assembly of an extrusion device according to a first embodiment of the invention and FIG. 2b is a view on a larger scale of a detail of the left part of FIG. 2a, FIG. 3 is a perspective view of an extrusion device produced according to an alternative form of the first embodiment, the barrel being shown in part section in order to show the screw, FIG. 4 is a perspective view of the working ring of FIG. 3, FIG. 5 is a perspective view of the holder of the working ring of FIG. 4, FIG. 7b is a view on a larger scale of a detail of the left part of FIG. 7a.

Figure 6A:
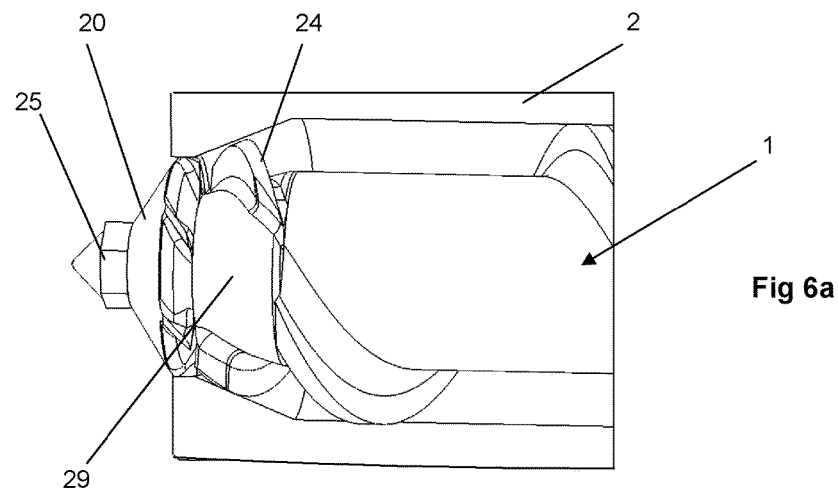
FIG. 6a is a front view of an extrusion device produced according to a second alternative form of the first embodiment.

In the various figures, elements that are identical or similar bear the same reference. They are therefore not systematically redescribed.

DETAILED DESCRIPTION OF SPECIFIC EMBODIMENTS

FIG. 1a depicts a view in longitudinal section of a screw and barrel assembly forming part of an extrusion device or extruder according to the art. The extruder comprises a screw 1 rotationally driven about its longitudinal axis inside an elongate cylindrical enclosure forming a barrel 2. The screw 1 is provided with helical flights 3 the pitch and inclination of which are defined according to the type of work that the extruder is to provide. The helical flights 3 collaborate with the internal wall 4 of the barrel 2 to perform the work of homogenizing and to allow the mixture to progress between a feed throat 5 at which the material is introduced and an exit opening 6 at which the mixture leaves the barrel 2. The material feed throat 5 is situated near the upstream end 7 of the screw 1 and the mixture exit opening 6 is situated near the downstream end 8 of the screw 1, as viewed with respect to the direction in which the material travels inside the barrel 2. The downstream end 8 of the screw 1 opens into an adapter of conical overall shape which receives the mixture before it passes through an exit die (these are not depicted in the drawings). The adapter is produced within a support mounted removably at the exit opening 6 for the mixture (not depicted in the drawings) for example being able to move in pivoting about an axis perpendicular to the longitudinal axis of the screw 1. Such an adapter holder, after removal, allows access quickly to the exit opening 6 of the barrel 2 and to the downstream end 8 of the extruder screw 1.

The screw 1 has a tubular overall shape; it comprises a duct 9 in which a screw coolant from a hydraulic circuit of the extruder (which circuit is not depicted in the drawings) circulates. The duct 9 is closed at the downstream end 8 by a threaded plug 10 fitted with seals 11 and, at the upstream end 7, is connected to the hydraulic circuit. The tip 12 of the plug 10 constitutes the downstream end 8 of the screw 1 and with the internal wall 4 of the barrel 2 forms a convergent passage 14. The dimensions of the downstream end of the passage 14 are dictated by the difference between the inside diameter of the exit orifice 6 of the barrel 2 and the outside diameter of the tip 12 measured at the exit orifice 6, this difference defining an annular gap "e" through which the mixture passes.

According to an embodiment of the invention, a working ring 20, 30 is arranged near the downstream end of the screw 1 to modify the initial dimension of the gap "e" to a value "$e_1$" and thus adapt the characteristics of the extruder to suit the composition and the physico chemical properties of the mixture.

FIGS. 2a and 2b illustrate a first embodiment of the invention in which there may be seen a working ring 20 which is mounted at the downstream end 8 of the screw 1 consisting of the tip 12 of the plug 10. The ring 20 is of cylindrical overall shape, its internal surface is produced in such a way as to be able to fit the external surface of the tip 12 of the plug 10 to which it is fixed by means of a screw 25. The ring 20 has a collar 21 of larger diameter which, with the diameter of the exit orifice 6 of the barrel 2 defines a gap "$e_1$". The collar 21 corresponds to the usable width of the ring, and is extended by a skirt 22 comprising an interior assembly surface of conical shape that collaborates with the exterior surface of conical shape of the downstream end 8 of the screw 1, in this instance that of the tip 12 of the plug 10 so as to centre and axially position the ring with respect to the screw of the extruder, quick tightening using the screw 25 holding the ring in position. In an alternative form, the ring 20 stops at the collar 21 and no longer has a skirt 22, making it easier to extract and replace with another working ring without emptying the extruder.

In one advantageous embodiment, the screw 25 and the plug 10 have screw threads of opposite hand so as to prevent unwanted opening of the plug when removing the working ring.

In operation, when the screw 1 is turned, the material arriving in the extruder via the feed throat 5 is worked as it passes towards the exit orifice 6 and is converted into a fairly homogeneous mixture. Before exiting the barrel, the mixture is worked by the ring 20; it undergoes additional shearing as it passes through the gap "$e_1$", which shearing is between the fixed wall of the barrel 2 and the moving one of the working ring 20, this producing a pressure drop that causes the delivery per turn of the screw to decrease and makes it possible in this way to increase the work done on the mixture. This then yields a more homogeneous mixture at the exit because the external diameter of the working ring 20, and therefore the work performed by this ring, is chosen to suit the composition and type of mixture present in the extruder, while allowing the mixture to be completely removed because one of the walls that performs the shearing is able to move (unlike a screen or breaker plate with passage orifices which is mounted at the exit, where the mixture plugs the orifices and passage holes).

Experimental work on defining the size of the gap "$e_1$" is carried out beforehand according to the composition and physico chemical properties of the various mixtures that will be worked with a given extruder. This characterization work makes it possible to define a set of rings of different diameters and with different working surface geometries that are to be used with the extruder according to the mixture used.

FIG. 3 illustrates an alternative form of the first embodiment of the device of the invention which comprises a working ring 20 mounted on the screw 1 by means of a support 23 of conical overall shape (best visible in FIG. 5). More particularly, the working ring 20 comprises an internal shoulder 27 which fits together with the external shoulder 28 of the support 23, the assembly being secured to the plug 10 using a screw 25. The support 23 has a thread 24 produced on the conical exterior surface 29 of the support 23 which is arranged on the plug 10 and has turns closer together than those of the flights 3 of the screw 1. The support 23 thus allows the mixture to be advanced via a divergent passage 15 as far as the periphery of the working ring 20. The working ring 20 (best visible in FIG. 4) has crenulations 26 the crest diameter of which has a small clearance with respect to the internal wall of the barrel 2 (just enough clearance for the ring to be able to turn inside the barrel), and the base diameter of which itself defines the gap "$e_1$" with the internal wall of the barrel 2, measured at the exit orifice 6. The height of the crenulations is defined as a function of the composition of the mixture so that the mixture can be best worked between the internal wall of the barrel and the bottom of the crenulations. Indeed it has been established during testing under laboratory conditions that vortices of mixture form behind each crenulation, making it possible to obtain better homogeneity of the mixture at the exit of the extruder. The crenulations 26 are preferably inclined. Thus, during tests conducted under laboratory conditions it has been found that when the angle made by the tangent to the longitudinal direction of the crenulations 26 and the axial direction of the screw 1 (understood with a straight line parallel to the longitudinal axis of the screw) is less than 45°, the crenulations 26 provide additional shearing work and therefore ensure better homogeneity of the mixture comprised, whereas when this angle is comprised between 45° and 80°, the crenulations 26 contribute to the operation of emptying the extruder. In one alternative form, the crenulations 26 may be straight (which is to be understood as meaning running parallel to the axial direction of the screw).

Figure 6B:
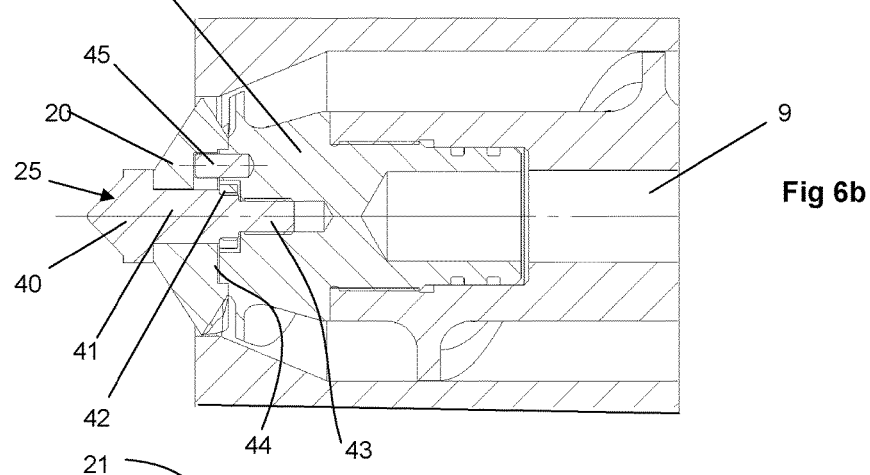
FIG. 6b is a view in axial section of the device of FIG. 6a and FIGS. 6c and 6d depict a side view and a perspective view of the working ring of FIG. 6a, FIG. 7a is a view in longitudinal section showing a screw and barrel assembly of an extrusion device according to a second embodiment of the invention
Figures 6C, 6D:
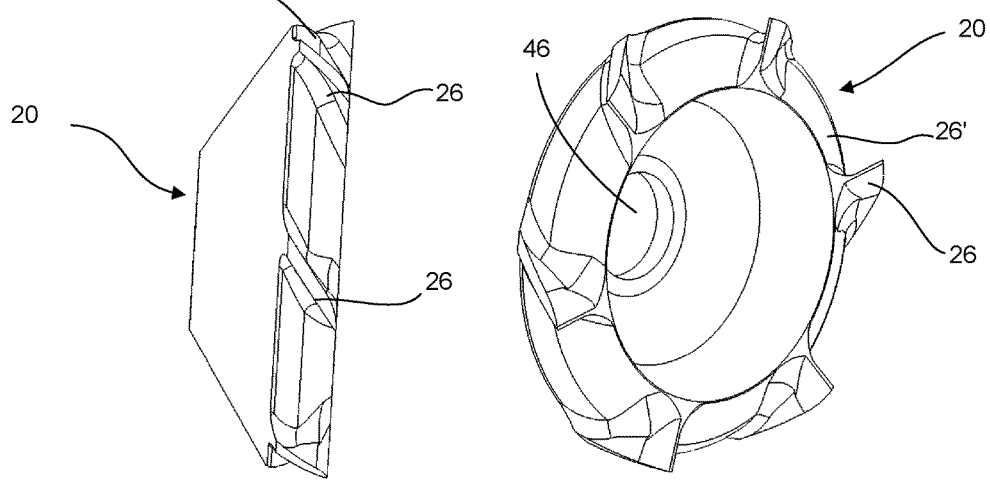

FIGS. 6a to 6d illustrate a second alternative form of the first embodiment of the device of the invention. In this alternative form, the plug 10 is made in such a way as to have an exterior surface similar to that of the support 23 of the device of FIG. 3, more particularly a conical exterior surface 29 with helical threads 24 the helixes of which have a pitch smaller than the helixes of the flights 3 of the screw 1. The working ring 20 of FIGS. 6a to 6d has crenulations 26 in the form of a helix made over the width of the collar 21. The gap "$e_1$" is defined by the difference between the inside diameter of the inside wall of the barrel 2 and the outside diameter of the base 26' of the crenulations 26. The angle made by the direction of the helix of the crenulations 26 with the axial direction of the ring is chosen according to a desired effect, notably for values less than 45° the shearing work provided by the working ring 20 is enhanced and for values comprised between 45° and 80°, the crenulations 26 help with removing the mixture from the extruder, in addition to providing shearing work. Advantageously, the screw 25 is produced in such a way that the working ring 20 can be extracted at the end of the unscrewing travel. Thus, the screw 25 comprises a screw head 40 at the end of a threaded shank the head portion 41 of which is produced in such a way as to be able to pass with clearance through the central orifice 46 of the ring 20 and the end portion 43 of which is produced in such a way that it can be screwed into an orifice provided for that purpose in the plug 10. A threaded washer 42 is arranged between the head portion 41 and the end portion 43 and butts against the lateral end 44 of the working ring 20 as the screw 25 is unscrewed and allows the working ring 20 to be extracted at the same time as the screw 25. A tenon 45 fixed in the frontal part of the plug 10 collaborates with an orifice made in the working ring 20 and prevents the latter from turning.

FIGS. 7a and 7b illustrate a second embodiment of the invention where it may be seen that there is a working ring 30 mounted at the downstream end of the barrel 2. The exterior surface 31 of the working ring 30 is of cylindrical overall shape, the ring is inserted in an orifice of corresponding shape made at the end of the barrel 2 and fixed by means of fixing screws at the periphery (for example by providing fixing flanges or a flange ring, which have not been depicted in the drawings). The interior surface of the working ring 30 comprises a portion of conical shape 32 which, with the screw 1, forms a convergent passage 14 and ends in a cylindrical portion 33 which, with the outside diameter of the tip 12 of the plug 10 defines the gap "$e_1$". As in the previous case, the cylindrical portion 33 may be provided with crenulations that are inclined and rectilinear or in the form of a helix, the gap "$e_1$" in this case being defined in a similar way to that of the ring 20.

The working ring 20, 30 is preferably made from the same material as the extrusion screw 1.

In an alternative form not depicted in the drawings, it is conceivable to mount, in combination, a removable working ring 20 on the screw 1 and a removable working ring 30 on the barrel 2, thereby making it possible to increase the range of values for the size of the gap "$e_1$".

The invention also makes provision for adapting the working ring 20, 30 to suit the mixture of elastomers used by altering both the size of the gap "$e_1$" and the usable width of the working ring. For that, for a given diameter, and, therefore, for a predetermined gap size, a set of rings of different widths are provided.

Other alternative forms and embodiments of the invention may be contemplated without departing from the scope of the claims thereof. Thus, use may be made of a removable working ring of variable diameter, for example a split ring associated with a control mechanism capable of varying the diameter thereof.

The invention claimed is:

1. A device for extruding mixtures of elastomers comprising:
   a rotary screw with helical flights,
   a fixed barrel in which the rotary screw is arranged,
   wherein an upstream end of the screw is able to be coupled to rotational-drive means, and
   wherein a downstream end of the rotary screw is able to propel a mixture towards an exit die,
   wherein the rotary screw has a tubular shape to allow a fluid to flow,
   wherein the downstream end of the rotary screw having an outside diameter defining, with an inside diameter of an exit orifice of the fixed barrel, a gap for the passage of the mixture,
   a working ring mounted directly removably with the aid of quick-fit means near the downstream end of the rotary screw, so as to modify the gap according to the composition of the mixture used and apply a shear stress to the mixture in the gap, and
   wherein the working ring is of only a cylindrical overall shape with a diameter greater than its width and is hollow and has crenulations that are inclined and rectilinear or in the form of a helix.

2. The device according to claim 1, wherein the working ring forms a width of the gap being defined by a 0.5 to 5 percent value of the nominal diameter value of the extruder.

3. The device according to claim 1, wherein the working ring is mounted on a closure plug, which forms the downstream end of the rotary screw.

4. The device according to claim 1, wherein the working ring is mounted inside the fixed barrel.

5. The device according to claim 1, wherein the crenulations that are inclined or in the form of a helix make an angle of less than 45° with the axial direction of the rotary screw.

6. The device according to claim 1, wherein the crenellations that are inclined or in the Form of a helix make an angle of between 450 and 800 with the axial direction of the rotary screw.

7. The device according to claim 1, wherein the width of the working ring is less than or equal to the diameter of the rotary screw.

8. A device for extruding mixtures of elastomers comprising:
   a rotary screw with helical flights,
   a fixed barrel in which the rotary screw is arranged,
   wherein an upstream end of the screw is able to be coupled to rotational-drive means,
   wherein a downstream end of the rotary screw is able to propel a mixture towards an exit die,
   wherein the rotary screw has a tubular shape to allow a fluid to flow,
   wherein the downstream end of the rotary screw having an outside diameter defining, with an inside diameter of an exit orifice of the fixed barrel, a gap for the passage of the mixture,
   a working ring mounted directly removably with the aid of quick-fit means near the downstream end of the rotary screw, so as to modify the gap according to the composition of the mixture used and apply a shear stress to the mixture in the gap, wherein the working ring is of only a cylindrical overall shape with a diameter greater than its width and is hollow, wherein the working ring is mounted on a closure plug, which forms the downstream end of the rotary screw, and wherein the working ring includes a collar, the collar being of the same cylindrical shape of the working ring, and of a greater diameter than the rotary screw.

9. The device according to claim 8, further comprising a support member, the support member being attached to closure plug.

10. The device according to claim 9, further comprising a second screw, the second screw attaching the working ring, the support member and the closure plug together.

11. The device according to claim 9, wherein the support member tapers in an outward direction.

12. The device according to claim 9, wherein the collar extends a diameter of the working ring, so the collar being of a greater diameter than the support member.

13. The device according to claim 12, further comprising a skirt, the skirt being attached the collar.

14. The device according to claim 9, wherein the support member, the collar, and the rotary screw include crenulations that are similar.

15. The device according to claim 8, wherein the collar includes crenulations and the working ring includes crenulations that are inclined and rectilinear or in the form of a helix, and the crenulations of the collar differing in space than the crenulations on the working screw.

16. The device according to claim 8, wherein the working ring forms a width of the gap being defined by a 0.5 to 5 percent value of the nominal diameter value of the extruder.

\* \* \* \* \*